March 29, 1966 R. F. WOODCOCK 3,243,150
AEROSPACE VEHICLE AND TANK STRUCTURE
Filed April 9, 1964 2 Sheets-Sheet 1

INVENTOR.
ROBERT R. WOODCOCK
BY
AGENT

March 29, 1966 R. F. WOODCOCK 3,243,150
AEROSPACE VEHICLE AND TANK STRUCTURE
Filed April 9, 1964 2 Sheets-Sheet 2

INVENTOR.
ROBERT R. WOODCOCK
BY
AGENT

United States Patent Office 3,243,150
Patented Mar. 29, 1966

3,243,150
AEROSPACE VEHICLE AND TANK STRUCTURE
Robert Reed Woodcock, Downey, Calif., assignor to The Boeing Company, Seattle, Wash., a corporation of Delaware
Filed Apr. 9, 1964, Ser. No. 358,443
8 Claims. (Cl. 244—135)

This invention relates to an aerospace vehicle and tank structure and more particularly to tanks for storing cryogenic propellants used in supersonic and hypersonic aerospace vehicles.

One of the propellants to be used in aerospace vehicles (such as; aerospace planes, hypersonic transports, hypersonic research vehicles, reusable launch vehicles, etc.) is liquid hydrogen ($LH_2$) which has a relatively low density of about 4.4 pounds per cubic foot under cryogenic conditions.

Vehicle concept studies repeatedly show that the $LH_2$ fuel tanks make up a major part of the total vehicle volume and the total inert weight. Storage of $LH_2$ therefore requires large volume and well insulated storage tanks.

The present invention provides a manner of combining the fuel tank structure with the vehicle primary structure in an unique way, and thus keeping the large volume and weight within the required limits.

Furthermore this combined structure is provided with insulation materials for extreme high and extreme low temperatures. For instance; a hypersonic vehicle might experience during its boost-flight and re-entry flight outer skin temperatures of approximately +1600 to +2000 degrees Fahrenheit, while the inner tank structure during boost-flight may be approximately −400 degrees Fahrenheit and during re-entry (assuming the $LH_2$ tank is empty) as high as +1200 degrees Fahrenheit.

Structural concepts proposed to date embody difficulties such as; (a) the load carrying structure is immersed in the cryogenic propellant (so called "wet-structure") which may result in extreme thermal leakage and provides complex cryogenic insulation problems, (b) load carrying structures of honeycomb or mutiple skin sandwich structures provide manufacturing problems and complex skin joints, and (c) tank-head intersection structures are very complicated when wet structure or honeycomb structures are used and accordingly create a number of reliability problems.

Therefore, one of the purposes of applicant's invention is to provide a combined well insulated vehicle-tank structure without having the problems encountered in wet-structures, and the tank-head intersection problems encountered with honeycomb or multiple skin sandwich structures.

It is therefore an object of this invention to provide an aerodynamic integrated vehicle-tank structure.

It is another object of this invention to provide an integrated hot-cold aero-dynamic structure having a continuous even thickness of cryogenic insulation without any disruption or penetration of associated vehicle construction components.

It is another object of this invention to provide a tank structure integrated with an external continuous load carrying vehicle structure.

It is another object of this invention to provide a cryogenic tank structure with a minimum of thermal leakage and adapted for simple structural tank head configurations.

It is another object of this invention to provide an integrated hot-cold aero-dynamic combined vehicle tank structure having a simple tank-head construction which does not interrupt the load carrying structure and does not require pressurized compartments.

It is another object of this invention to provide a combined vehicle tank structure easily adapted for series-connection of cryogenic tanks in sausage type configuration.

Other objects of the invention will become apparent from the following description taken in connection with the accompanying drawings in which.

In brief the invention contemplates a novel construction for aerospace vehicles carrying cryogenic propellants in one or more tanks wherein the cryogenic tank structures are integrated with the vehicle structure.

Furthermore the inside structure has a smooth liquid tight stressed skin which is covered on its inner surfaces with a layer of cryogenic insulation. A number of stringers are mounted on the outside surface of this stressed skin and form the longitudinal construction members of the vehicle and a number of frame members are mounted in a substantial perpendicular relationship with respect to the stringers and thus form the vertical construction members or stations of the vehicle. A heat erosion shield of replaceable panels, ablative coated skins, or radiation panels is then mounted on the frame members and forms the external aero-dynamic skin surface of the vehicle.

Figure 1:
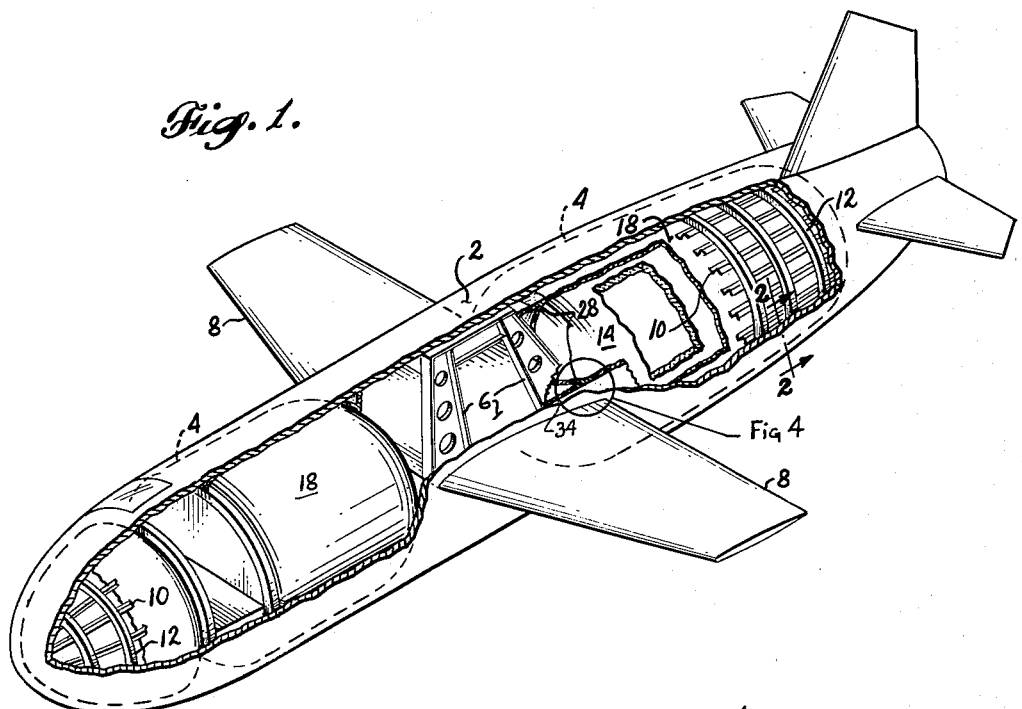
FIG. 1 is an isometric view of an aerospace vehicle showing a series of cryogenic fuel tanks being part of the vehicle construction.

Referring now to FIG. 1, an aerospace vehicle 2 is illustrated which has a number of cryogenic containers 4 integrally incorporated within its body construction. The cryogenic containers 4 are non-continuous in a sausage type of configuration and thus permits continuous beam structural arrangements 6 for wings 8 to protrude through the body of the vehicle 2 without penetration of the beam structure arrangements 6 through the cryogenic containers 4, thus preventing wet-structures, and their associated problems. Stringer members 10 carry the longitudinal loads and stresses through the tank vehicle wall structure while transverse loads are handled in a similar fashion by the circumferential frame members 12. The circumferential frame members 12 are mounted in substantially perpendicular relationship on and about the stringers 10.

Figure 2:
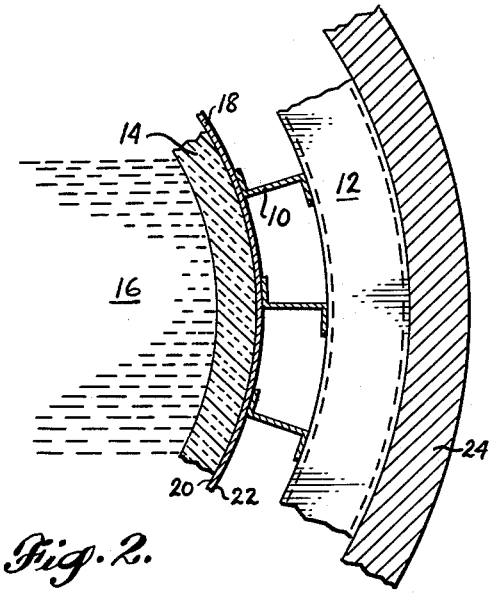
FIG. 2 is a section of the cryogenic tank-vehicle structure taken along the line 2—2 of FIG. 1.

FIG. 2 illustrates a small section of the vehicle tank structure. A portion of the container 4 is shown which includes a cryogenic insulation layer 14 and a stressed skin 18, the cryogenic insulation layer 14 separates the cryogenic propellant 16 from the inner surface 20 of the stressed skin 18 and provides thermal insulation between the fuel 16 and the area outside of the container 4. The outside surface 22 of the skin 18 is mounted on a frame structure of longitudinal stringers 10 and circumferential frame members 12. A heat erosion shield material 24 is carried by the circumferential frame members 12 and defines the outside aero-dynamic hot-face of the aerospace vehicle 2.

Figure 3:
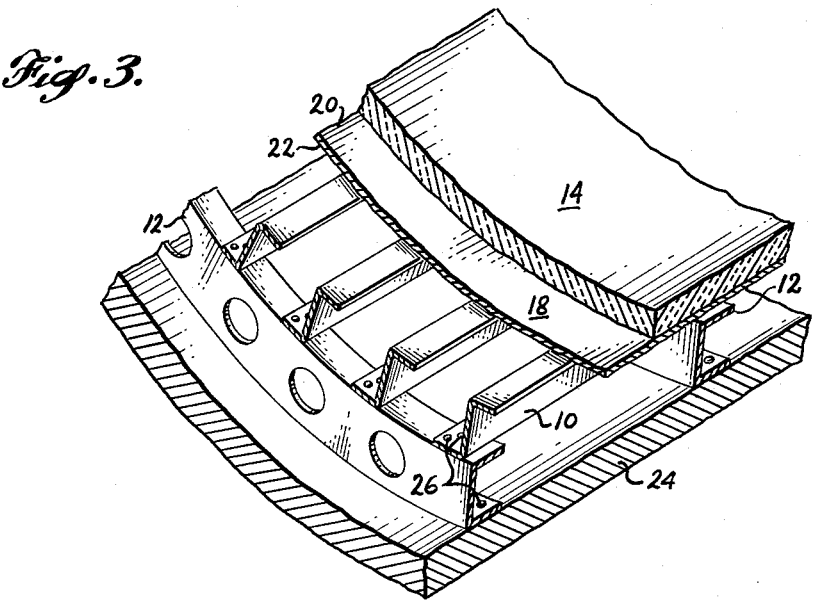
FIG. 3 is an isometric view of the section as shown in FIG. 2 and illustrates in detail the connection of the longitudinal stringers and station frames.

FIG. 3 illustrates in isometric fashion the schematic basic structural concept of FIG. 2, in order to show clearly the mounting details and mounting means 26 of the structural components and the arrangement of the several structural layers with respect to one another in the construction of the cryogenic tank-vehicle.

Figure 4:
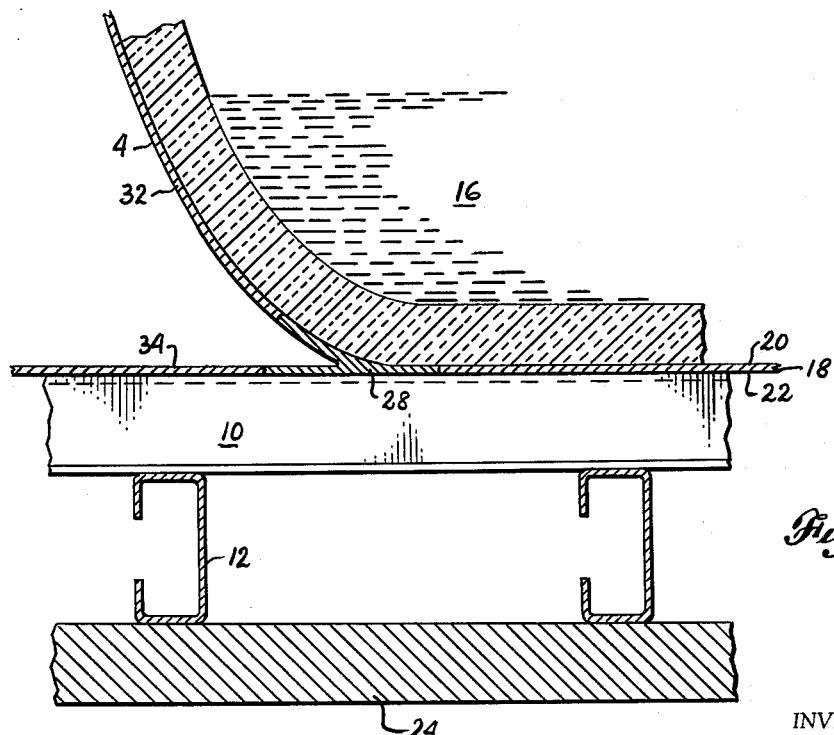
FIG. 4 is a section of the preferred construction of the tank-head intersection structure by the use of a conventional "Y" ring-joint.

FIG. 4 visually explains the basic structural concept for the manufacture of tank-heads in a very simple manner by using a "Y" ring joint 28, thus providing a continuous smooth inner surface 20 of the stressed skin 18 and permitting the cryogenic insulation 14 to continue smoothly with a constant thickness and without any interruption resulting in an equal thermal insulation control for the cryogenic propellant 16.

Each container 4 has a cylindrical middle portion 30 being connected on each end to a hemispherical outer portion 32 by a "Y" ring extrusion 28.

An interconnecting stressed skin 34 will continue from the "Y" ring 28 along the stringers 10 to the next "Y" ring 28 of any additional container when the use of more containers is applicable.

The simplicity of manufacturing reliable tank-head intersections by means of a conventional "Y" ring 28 permits the dividing of the required propellant volume into a series of containers 4 as is illustrated in FIG. 1 and thus provides unrestricted open areas for structural arrangements, such as wings, compartments, etc., to be located in between the containers 4.

It is understood that the construction of the tank-vehicle structure can incorporate various combinations of cryogenic insulation and heat erosion protection materials and that the tanks illustrated herein can be varied in size and shape.

It is also understood, whenever the term "aerospace vehicle" is used in this specification and claims that this term relates to all kinds of aerospace vehicles such as: aerospace planes, supersonic and hypersonic transports, re-entry vehicles, space test vehicles and outer space stations, etc.

The references made to temperatures encountered when liquid hydrogen is stored and the outside temperatures experienced by the vehicle 2 are approximate and for purposes of explanation only, and these temperatures will vary widely with the type of stored liquid and vehicle trajectories.

Various other structural modifications of the invention may be contemplated by those skilled in the art without departing from the spirit and scope of the invention as hereinafter defined by the appended claims.

I claim as my invention:

1. An aerospace vehicle using cryogenic propellants and having its tank construction integrated with the aerospace vehicle construction comprising in combination:
   (a) a container,
   (b) cryogenic insulation carried by the inside surface of said container,
   (c) a plurality of longitudinal members mounted on the outside surface of said container,
   (d) a plurality of frame members mounted substantially perpendicular on said longitudinal members; and
   (e) erosion material mounted on said frame members.

2. The aerospace vehicle as claimed in claim 1, wherein said container comprises an assembly of a cylindrically shaped middle portion and hemispherically shaped outer portions, said outer portions forming the tank heads of the vehicle tank construction and connected with said middle portion, thereby forming an enclosed container.

3. An aerospace vehicle as claimed in claim 1 wherein said plurality of longitudinal members are mounted in spaced relationship with one another and are disposed to carry longitudinal loads in conjunction with said container surfaces encountered by the aerospace vehicle construction.

4. An aerospace vehicle as claimed in claim 1, wherein said inside surface of said container is smooth and said cryogenic insulation mounted thereon being smooth and non-interrupted in order to provide a constant thermal insulation for associated cryogenic fluids.

5. A cryogenic tank construction being part of an aerospace vehicle comprising in combination:
   (a) an aerospace vehicle having an outside skin of heat erosion material for insulation of high temperatures experienced during flight of said aerospace vehicle,
   (b) circumferential frame members and longitudinal stringer members mounted in substantially perpendicular relationship with one another and adapted to carry loads encountered by said aerospace vehicle,
   (c) said heat erosion material being mounted on said frame members,
   (d) a stressed skin mounted on said longitudinal members and forming an enclosed container having a smooth inside surface for storing of cryogenic fluids and,
   (e) a layer of cryogenic insulation covering said smooth inside surface of said container and adapted to prevent cryogenic leakage from associated cryogenic fuel stored in said container.

6. An aerodynamic construction for an aerospace vehicle combined with a tank configuration containing cryogenic propellants comprising in combination:
   (a) a metal sheet container having a smooth inner surface,
   (b) a layer of cryogenic insulation material carried by said inner surface for the control of thermal movements about said container,
   (c) stringer members mounted in spaced relationship on said container to establish a longitudinal structure for the aerospace vehicle,
   (d) frame members for circumferential structure of the aerospace vehicle and mounted in substantially perpendicular relationship on and about said stringers,
   (e) a layer of heat resistant material mounted on and about said plurality of frame members and forming the outside skin of the combined tank aerospace vehicle.

7. An aerospace vehicle as claimed in claim 6, wherein said container comprises an assembly of a middle portion connected to outer portions, "Y" shaped extrusion means for connecting said outer portions to said middle portion in such a manner that said smooth inner surface of said container is achieved.

8. An aerodynamic construction for an aerospace vehicle combined with a tank configuration containing cryogenic fuels comprising in combination:
   (a) a metal sheet container having a middle portion and two outer portions,
   (b) "Y" shaped extrusion means connecting each of said outer portions to said middle portion,
   (c) a layer of cryogenic insulation suitably secured and carried by the inside of said container for control of thermal movements about said container,
   (d) a frame construction of a plurality of longitudinal stringer members and frame members mounted on one another in perpendicular relationship and said frame structure suitably mounted on and about said container and,
   (e) erosion shield material carried by and secured to said frame construction thereby defining the aerodynamic periphery of the aerospace vehicle.

References Cited by the Examiner

UNITED STATES PATENTS

| | | | |
|---|---|---|---|
| 2,741,447 | 4/1956 | Heal | 244—119 |
| 2,958,482 | 11/1960 | Summers | 244—74 |
| 2,992,622 | 7/1961 | Maker | 114—74 |
| 3,169,379 | 2/1965 | Black | 220—9 |

MILTON BUCHLER, *Primary Examiner.*

A. E. CORRIGAN, *Examiner.*